(No Model.)

G. B. BEALE.
ROTARY CUTTER.

No. 543,608.   Patented July 30, 1895.

Witnesses

Inventor
George B. Beale
By Wilmarth H. Thurston,
Attorney.

UNITED STATES PATENT OFFICE.

GEORGE B. BEALE, OF PROVIDENCE, RHODE ISLAND, ASSIGNOR TO THE BROWN & SHARPE MANUFACTURING COMPANY, OF SAME PLACE.

ROTARY CUTTER.

SPECIFICATION forming part of Letters Patent No. 543,608, dated July 30, 1895.

Application filed February 21, 1894. Serial No. 500,998. (No model.)

*To all whom it may concern:*

Be it known that I, GEORGE B. BEALE, of the city and county of Providence, in the State of Rhode Island, have invented certain new and useful Improvements in Rotary Cutters; and I do hereby declare the following specification, taken in connection with the accompanying drawings, forming a part of the same, to be a full, clear, and exact description thereof.

It has been found that rotary metal-cutters, as heretofore constructed, while well adapted for operating upon cast iron or steel, or other metals of a hard, brittle character, are not well adapted for operating upon metals of a soft tenacious character—such, for instance, as copper or aluminum. In cutting metals of a soft tenacious character the chips do not cleave off cleanly in front of the teeth of the cutter, as they do in cutting cast iron or steel, but instead have a tendency to spread out or flow laterally in a direction parallel with the cutting-face of the tooth, thereby causing the chips to become more or less wedged or clogged and preventing the ready and effective clearance thereof. By reason of this fact much trouble has been experienced in cutting or operating upon metals of such soft tenacious character with rotary cutters such as heretofore constructed, and they have proved to be very unsatisfactory for such purpose.

The object of the present invention is to provide a metal-cutter which will work satisfactorily and without clogging upon metals of a soft tenacious character—such as copper or aluminum, for instance.

To that end the invention consists, primarily, of a rotary metal-cutter having a portion of its teeth of greater radius, but with narrowed cutting-faces, as compared with the remaining teeth.

Figure 1:
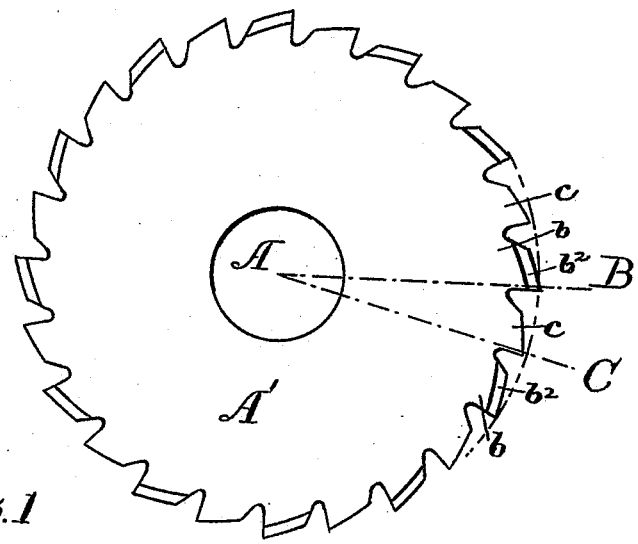
Figure 2:
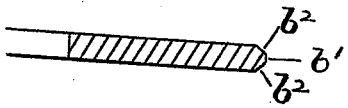
Figure 3:

Referring to the drawings, Figure 1 is a side view of a rotary metal-cutter embodying my invention. Fig. 2 is a section on the line A B of Fig. 1. Fig. 3 is a section on the line A C of Fig. 1; and Fig. 4 is a cross-section of a piece of work, showing the form of groove cut by such cutter.

A portion of the teeth $b$ of the cutter $A'$ are of greater radius—*i. e.*, have their cutting-edges at a greater distance from the axis of the cutter than the remaining teeth $c$ and have their cutting-faces narrowed. The purpose of thus narrowing the cutting-faces of the teeth $b$ is to cause each of said teeth to cut a chip which extends only a portion of the width of the groove to be cut by the entire cutter. It is preferred to form the teeth $b$ so that the narrowed cutting-edge $b'$ of each of said teeth will be located at the center of the tooth, as shown in Fig. 2; but this is not necessary, and such narrowed cutting-edge may, if desired, be located at one side of the center. It is also preferred to form the narrowed cutting-face by beveling the sides of the tooth, as at $b^2$ $b^2$, Fig. 2, but such narrowed cutting-face may be formed in any other desired manner. Preferably the teeth $b$ of greater radius and narrowed cutting-face are arranged alternately with the teeth $c$, as shown in Fig. 1; but, if desired, the teeth may be otherwise arranged—as, for instance, by having two of the teeth $c$ follow each of the teeth $b$. Each of the teeth $c$ is made with its cutting-edge $c'$ extending the entire width of the tooth, as shown in Fig. 3.

Figure 4:
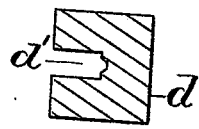

In Fig. 4 is shown a piece of work $d$, having cut therein a groove $d'$, such as is formed by the successive action of the teeth $b$ $c$.

The operation of a cutter constructed as above described is as follows: Each of the teeth $b$ will remove a chip of less width than the width of the groove to be cut, and there will thus be an opportunity for such chip to spread or flow laterally, and when the narrowed cutting-face is located at the center of the tooth, and so as to cut its chip from the middle of the groove, there will be room for such chip to spread out upon each side of said cutting-face. The teeth $c$ will cut the remaining width of the groove, and in so doing each of said teeth will, when the narrowed cutting-face of the teeth $b$ is centrally located, cut two narrow chips, one upon each side of the narrow cut made by the preceding tooth $b$, instead of cutting a single chip of the entire width of said tooth $c$. There will thus be likewise room for the chips cut by said teeth $c$ to spread or flow toward each other and into the space formed by the preceding tooth $b$. Thus the chips removed are not only comparatively narrow and less than the entire width of the groove cut by the cutter, but, what is especially important, there is always ample room for the chips to spread out or expand, and consequently an easy and effective clearance is provided and liability of clogging entirely prevented.

A rotary cutter, constructed as above described, has been found to operate upon metals of a soft tenacious character with great facility and effectiveness, to be free from clogging, and to be of great practical value in operating upon metals of the character referred to.

What I claim as my invention, and desire to secure by Letters Patent, is—

1. A rotary metal cutter having a portion of its teeth of greater radius, but with narrowed cutting faces as compared with the remaining teeth, such narrowed cutting faces being formed by reducing said cutting faces to a width less than the thickness of the shanks of the teeth, the cutting faces of the shorter teeth being left of substantially the same width as said shanks, substantially as described.

2. A rotary metal cutter having a portion of its teeth of greater radius than the remaining teeth, each of said teeth of greater radius having a narrow cutting face arranged at the center of the tooth and formed by a double bevel, the cutting faces of the shorter teeth being of substantially the same width as the shanks of the teeth, substantially as described.

GEO. B. BEALE.

Witnesses:
HENRY L. RICH,
H. J. BROWNELL.